United States Patent [19]

Knothe et al.

[11] Patent Number: 4,629,016

[45] Date of Patent: Dec. 16, 1986

[54] METHOD OF INITIALIZING A BALANCE WITH COUNTING SCALE AND BALANCE WITH COUNTING SCALE FOR CARRYING OUT THE METHOD

[75] Inventors: Erich Knothe, Bovenden; Christian Oldendorf, Göttingen; Franz-Josef Melcher, Hardegsen, all of Fed. Rep. of Germany

[73] Assignee: Sartorius GmbH, Fed. Rep. of Germany

[21] Appl. No.: 727,423

[22] Filed: Apr. 26, 1985

[30] Foreign Application Priority Data

Apr. 28, 1984 [DE] Fed. Rep. of Germany ....... 3415962

[51] Int. Cl.$^4$ ...................... G01G 19/22; G01G 19/00
[52] U.S. Cl. .......................................... 177/25; 177/1; 177/200
[58] Field of Search .............................. 177/1, 25, 200

[56] References Cited

U.S. PATENT DOCUMENTS

| | | | |
|---|---|---|---|
| 4,157,738 | 6/1979 | Nishiguchi et al. | 177/200 X |
| 4,219,089 | 8/1980 | Gard et al. | 177/200 X |
| 4,447,885 | 5/1984 | Biss | 177/200 X |
| 4,493,384 | 1/1985 | Yano et al. | 177/200 X |

Primary Examiner—George H. Miller, Jr.
Attorney, Agent, or Firm—Eric P. Schellin

[57] ABSTRACT

In known methods of initializing a balance with counting scale a given quantity of the pieces to be counted is placed on the balance at the same time and the average individual weight is calculated therefrom and used as a base for the following piece counts. In contrast thereto, the invention suggests that the pieces be placed individually on the balance and that the standstill of the balance be waited for after each placing of a piece. This makes it possible to also calculate the standard deviation in addition to the average value and statements concerning the counting precision can be made which are based on known statistical laws, so that counting errors can be avoided.

9 Claims, 2 Drawing Figures

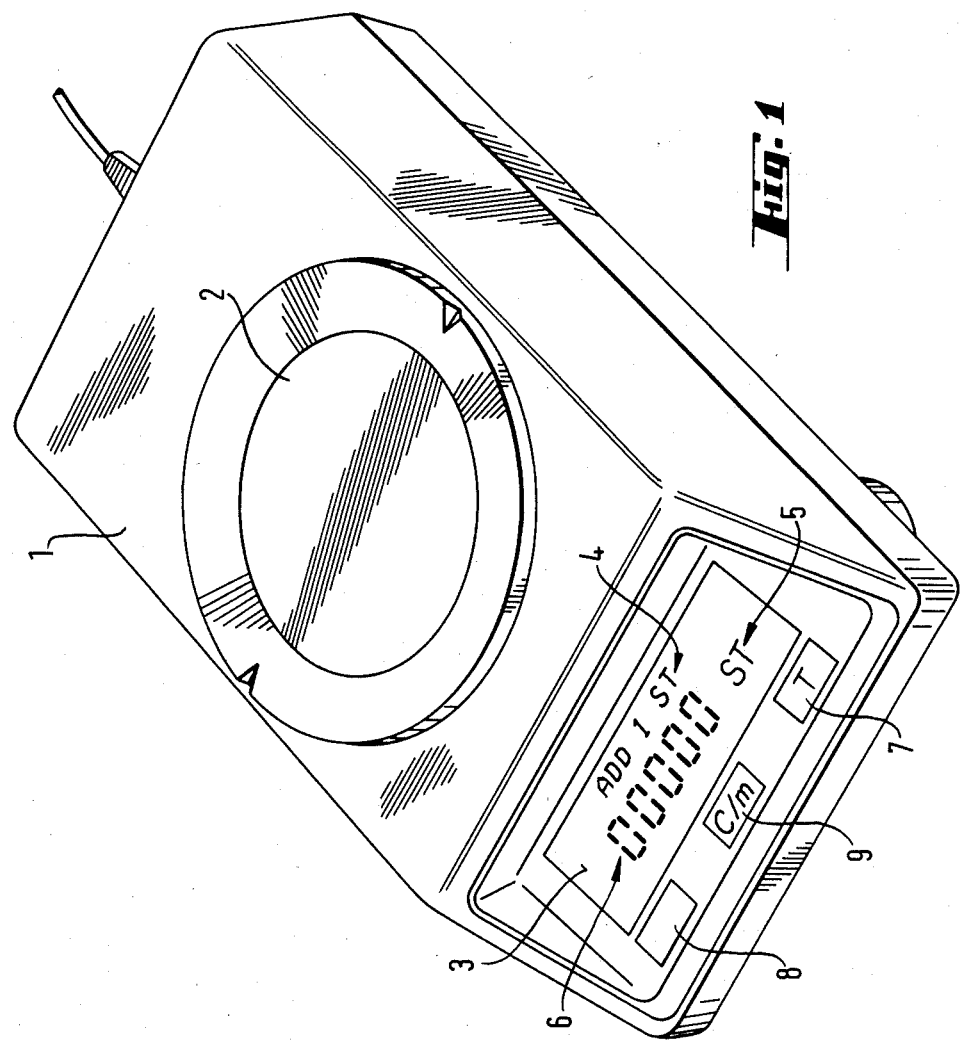

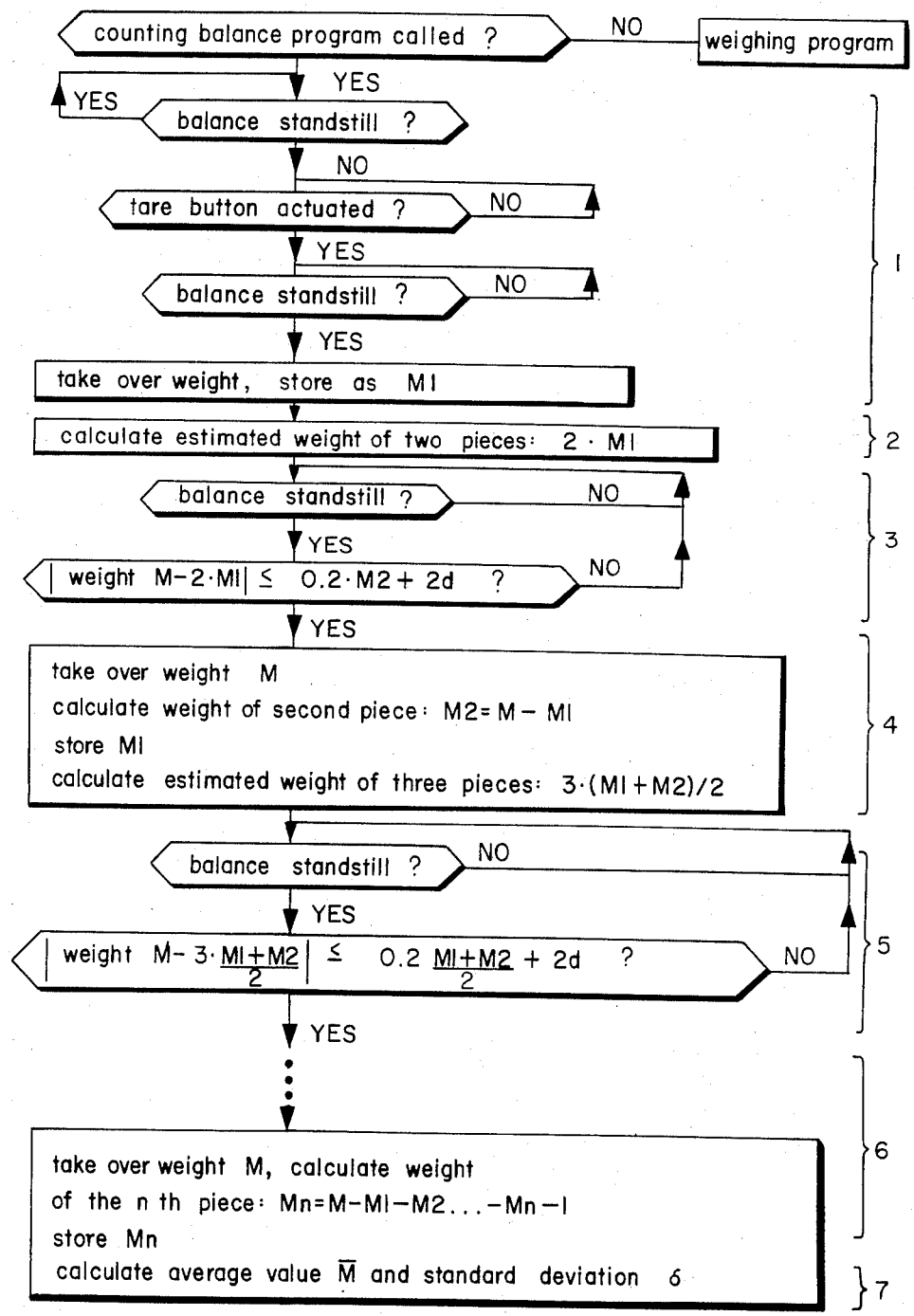

METHOD OF INITIALIZING A BALANCE WITH COUNTING SCALE AND BALANCE WITH COUNTING SCALE FOR CARRYING OUT THE METHOD

BACKGROUND OF THE INVENTION

1. Field of the Invention

The invention is relative to initializing a balance with a counting scale in which a given quantity of the pieces to be counted is placed on the balance in order to determine the individual weight.

2. Description of the Prior Art

Methods of this type are generally known. For example, DE-DS 28 20 843 teaches such a method in which a known small quantity (e.g. 10 pieces) of the pieces to be counted is placed on the balance, the average value for the individual weight is calculated therefrom and then any unknown quantity (e.g. 37) of the pieces to be counted is added. The total quantity is then calculated from the total weight and the average value from the individual weight, whereby no whole number generally results, on account of the imprecision of the weighings and the weight distribution of the pieces to be counted. This value is rounded off to a whole number and an improved average value from the individual weight is calculated from this whole number and from the total weight. This ends the initialization and the improved average value is used for the further determinations of quantity.

A disadvantage of this method is the fact that no statement about the precision of the result is possible. DE-OS 78 20 843 does provide for the generation of a warning signal of the non-integral value if the total quantity indicated above exhibits a figure between 4 and 6 after the decimal point.

Thus, if in the numerical example indicated above in parentheses the total number was calculated at 47.5, a warning signal would be generated. If, however, in the case of greater distributions of weight of the pieces to be counted the total number would be calculated even more incorrectly, e.g. at 47.9, the balance with counting scale in accordance with this method would not notice the deviation and would calculate the "improved average value" on the basis of the false qualtity of 48, therewith establishing a false initial value for all subsequent determinations of quantity.

SUMMARY

The invention has the task of indicating a method of initializing a balance with counting scale which allows a statement to be made concerning the precision of the counting and which avoids the described counting errors by this means.

The invention solves this task as follows: In a method of initializing a balance with counting scale in which a given quantity of the pieces to be counted is placed on the balance in order to determine the individual weight, the pieces are placed individually on the balance until the given quantity is reached, and the standstill of the balance is waited for after each placing of a piece.

This enables the balance with counting scale to determine the individual weights and also to advantageously calculate therefrom the standard deviation in addition to the average value. This makes it possible to make a statement about the precision of the determination of quantity in accordance with known mathematical interrelations.

The balance with counting scale requests other pieces in an advantageous manner if the counting precision which results from the resolution of the balance, the given quantity and the calculated standard deviaiton is worse than a given counting precision.

It is advantageous if this subsequent request is subdivided in such a manner that the quantity requested at one time remains so small that the probable counting error for this quantity is less than 1. In this manner the requested quantity can be dosed onto the balance without counting without incurring the danger of a counting error.

It is advantageous if the associated program is set up in such a manner that the operator can interrupt a further requesting of pieces by actuating a button and that the balance with counting scale utilizes the average value calculated up to that point for the conversion of weight into quantity. To this end it is advantageous if the balance with counting scale comprises a separate button. In this manner the successive improvement of the average value from the weight of the pieces to be counted can be broken off at any time.

The placing of the first piece is advantageously signaled to the balance with counting scale by the actuation of a button, e.g. the tare button, whereby the value is of course not taken over until after the standstill of the balance.

The taking-up of the weight of the subsequent pieces can then occur automatically with advantage as follows: After taking up the weight of the first piece, the balance with counting scale calculates the expected weight of two pieces, compares the determined new weight with the calculated weight of 2 pieces at the next standstill of the balance and takes up the new weight automatically, i.e., without a button having to be actuated, if there is agreement within certain limits. Correspondingly, the balance with counting scale can calculate the expected weight value for each of the following pieces to be placed, compare the determined weight with the calculated value at the next standstill and automatically take up the new weight if there is agreement within these limits.

In order to guide the operator, it is advantageous if the balance with counting scale comprises, in addition to the numerical display, another display field for alphanumeric characters in which the next step to be performed is signaled to the operator.

An operator guidance is also possible with the normal numeric display and an additional sound generator, for which reason it is advantageous if the balance with counting scale comprises a sound generator to emit an acoustic signal.

BRIEF DESCRIPTION OF THE DRAWINGS

The invention is described below with reference made to the figures.

FIG. 1 shows an outer view of a balance with counting scale with its display and operating elements.

FIG. 2 shows a flow chart of the individual steps of the initialization of the balance with counting scale.

DETAILED DESCRIPTION

The balance with counting scale schematically shown in FIG. 1 consists of housing 1, balance scale 2, display panel 3 and operating buttons 7, 8 and 9. Display panel 3 comprises numeric display 6 and a display for the unit of measure 5, e.g., "g" when weighing and "ST" (=piece, translator) during counting. Display field 4 is also present, in which any alphanumeric characters can be shown by a matrix display. The operating buttons comprise tare button 7, weigh/count shift button 9 and interruption button 8. In addition, the balance comprises a sound generator (not visible). If the program of the balance with counting scale is called by actuating button 9, this is indicated to the operator in display panel 3 by the lighting-up of unit of measure "ST" and by the display field 4, and the steps indicated in FIG. 2 in the form of a flow chart occur:

1. The balance with counting scale waits for the first piece to be placed while continuously monitoring the standstill of the balance. Once a load has been placed and the balance standstill consequently interrupted at least once, the balance with counting scale waits for the actuation of the tare button and takes the weight value after balance standstill and stores it as M1.

2. An estimated value for two pieces is calculated from the stored weight value M1, namely, twice M1.

3. The measured value supplied by the balance is subsequently continuously monitored until standstill, and a check is made at standstill whether the new value agrees within certain limits with the estimated value for 2 pieces. In the flow chart this "within certain limits" is quantified by 20%, for example, of the individual weight plus 2 digits. If this condition is met, the placing of the 2nd piece is acknowledged by a short acoustic signal and 4. The new weight value M is taken over and the actual weight M2 of the second piece is calculated from it and stored. The estimated value for three pieces can then be calculated from the values of M1 and M2, namely, three times.

$$(M1+M2)/2$$

5. The measured value supplied by the balance is subsequently constantly monitored again until standstill and a check is made at standstill whether the value agrees within certain limits with the estimated value for 3 pieces. If this is the case, the placing of the third piece is again acknowledged by a short acoustic signal, the weight value is taken over and the actual weight M3 of the third piece is calculated therefrom and stored. Then, the estimated value for 4 pieces is calculated.

6. This process is repeated until the given quantity n, e.g. 10 pieces in the flow chart of FIG. 2, has been reached.

7. Then, the average value $$\overline{M} = \frac{1}{n} \cdot \sum_{i=1}^{n} M_i$$

and the standard deviation $$\sigma = \sqrt{\frac{\sum_{i=1}^{n} (M_i)^2 - \frac{1}{n} \cdot \left(\sum_{i=1}^{n} M_i\right)^2}{n-1}}$$

are calculated.

This can conclude the initialization and the calculated average value M is taken as a base for the following piece counts if the calculated standard deviation in conjunction with the resolution of the balance and with the given quantity permits the likewise given precision requirement to be met. The precision requirement for the counting can be given, for example, by a menu technique such as is described in DE-OS 32 13 015. The termination of the initialization is signaled to the user, for example, by cancelling the additional display "ADD 1ST" and by the display of the quantity on the balance, e.g. 10 pieces.

If the given precision requirement is not met, the balance with counting scale calculates how many other pieces must be placed in order to meet the precision requirement. This subsequent request is subdivided by the balance with counting scale, if necessary, into piece requests of such a size that the counting error remains under 1 for each piece request, so that the user does not have to count the pieces requests but can simply place any number of pieces on the balance with counting scale and the balance will show him how many he has already placed.

How important a knowledge of the standard deviation of the weight of the pieces to be counted is is shown by the fact that given a fairly large standard deviation the total amount to be subsequently requested must be larger while the piece requests must be smaller. A fixed indication of the numbers would therefore result either in uselessly large amounts or in counting errors. The balance with counting scale calculates an improved average value after each piece request and calculates the final average value at the last piece request, which is then taken as a base for the following piece counts.

If the user does not wish to accept any more piece requests for any reason, he has the option of breaking off the initialization by actuating separate button 8 (in FIG. 1). The balance with counting scale then uses the last-calculated average value for the following piece counts.

We claim:

1. Method of initializing a balance with counting scale in which a given quantity of the pieces to be counted is placed on the balance in order to determine the individual weight, characterized in that the pieces are placed individually in the balance until the given quantity is reached and that the standstill of the balance is awaited after each placing for a piece, the counting scale calculates the average value and the standard deviation from the determined individual weights of the placed-on pieces and subsequently requests other pieces if the counting precision resulting from the resolution of the balance, the given quantity and the calculated standard deviation is worse than a given counting precision.

2. Balance with counting scale for carrying out the method of claim 1, characterized in that in addition to the numeric display (6) another display field (4) for alphanumeric characters is provided in which the next step to be performed is signaled to the user.

3. Method according to claim 1, characterized in that the balance with counting scale subdivides the subsequent request in such a manner that the quantity subsequently requested at one time remains so small that the probable counting error for this quantity is less than 1.

4. Method according to either claim 1 or 3, characterized in that the operator can interrupt a further subsequent requesting of pieces by actuating a button and that the balance with counting scale uses the average value calculated up to that point for the conversion of weight into quantity.

5. Balance with counting scale for carrying out the method of claim 4, characterized in that in addition to the tare button (7) the balance with counting scale comprises at least one other button (8).

6. Method according to claim 4, characterized in that the placing of the first piece is signaled by actuating a button on the balance with counting scale.

7. Method according to claim 6, characterized in that after taking up the weight of the first piece, the balance with counting scale calculates the expected weight of 2 pieces, compares the determined new weight with the calculated weight of 2 pieces at the next standstill of the balance and automatically, that is, without a button having to be actuated, takes up the new weight if there is agreement within certain limits.

8. Method according to claim 7, characterized in that the balance with counting scale calculates the expected weight value for each of the other pieces to be placed, compares the weight determined at the next standstill with the calculated value and automatically takes up the new weight if there is agreement within certain limits.

9. Balance with counting scale for carrying out the method of claim 8, characterized in that the balance signals the automatic taking-up of the new weight to the user by an acoustic signal from a sound generator.

* * * * *